US012754749B2

(12) United States Patent
Gurusamy et al.

(10) Patent No.: US 12,754,749 B2
(45) Date of Patent: Oct. 6, 2026

(54) SYSTEMS AND METHODS FOR PROVIDING INTERACTIVE FUNCTIONALITY TO DATA STREAMS

(71) Applicant: HONEYWELL INTERNATIONAL INC., Charlotte, NC (US)

(72) Inventors: Saravanakumar Gurusamy, Bangalore (IN); Bincicil Mathew, Bangalore (IN); Pavan Kumar Desai, Bangalore (IN)

(73) Assignee: Honeywell Aerospace US LLC, Phoenix, AZ (US)

( * ) Notice: Subject to any disclaimer, the term of this patent is extended or adjusted under 35 U.S.C. 154(b) by 229 days.

(21) Appl. No.: 18/791,633

(22) Filed: Aug. 1, 2024

(65) Prior Publication Data

US 2025/0390321 A1 Dec. 25, 2025

(30) Foreign Application Priority Data

Jun. 19, 2024 (IN) ............................ 202411047063

(51) Int. Cl.
*G06F 9/451* (2018.01)

(52) U.S. Cl.
CPC .................................. *G06F 9/451* (2018.02)

(58) Field of Classification Search
CPC ........................................ G06F 9/451
USPC ........................................ 715/745
See application file for complete search history.

(56) References Cited

U.S. PATENT DOCUMENTS

| | | | |
|---|---|---|---|
| 5,883,586 A | 3/1999 | Tran et al. | |
| 7,724,259 B2 | 5/2010 | Hedrick et al. | |
| 8,112,363 B2 | 2/2012 | Carro et al. | |
| 8,392,507 B2 | 3/2013 | Ramos et al. | |
| 8,981,968 B2 | 3/2015 | Huang et al. | |
| 9,405,751 B2 | 8/2016 | Hull et al. | |
| 9,691,287 B1 | 6/2017 | Shapiro et al. | |
| 10,235,890 B1 * | 3/2019 | McCusker | G08G 5/21 |
| 10,262,433 B2 | 4/2019 | Spiessl et al. | |
| 10,319,240 B2 | 6/2019 | Beernaert | |
| 10,425,461 B1 | 9/2019 | Zaehring | |

(Continued)

FOREIGN PATENT DOCUMENTS

| | | |
|---|---|---|
| DE | 102014218506 A1 | 3/2016 |
| EP | 3951322 A1 | 2/2022 |

(Continued)

*Primary Examiner* — William D Titcomb

(74) *Attorney, Agent, or Firm* — Ingrassia Fisher & Lorenz

(57) ABSTRACT

Systems and methods are provided that allow for providing interactive functionality to streamed data. The systems include a remote system configured to execute a program, generate a data stream that includes primary information indicative of a visual representation of a graphical user interface (GUI) of the program, and transmit the data stream. The system includes an aircraft that includes a controller configured to receive the data stream from the remote system, display the visual representation of the GUI on a display system based on the primary information, detect an interaction by a user with an interactive element of the GUI represented on the display system, and modify the visual representation of the GUI on the display system in response to detecting the interaction such that a modified visual representation of the GUI is displayed on the display system using supplemental information embedded in the data stream.

20 Claims, 6 Drawing Sheets

(56) References Cited

U.S. PATENT DOCUMENTS

| | | | | |
|---|---|---|---|---|
| 10,994,864 | B1 | 5/2021 | Zaehring | |
| 11,353,886 | B2 | 6/2022 | Boyer et al. | |
| 11,526,390 | B2 | 12/2022 | Mead et al. | |
| 11,537,269 | B2 | 12/2022 | Wohlstadter et al. | |
| 11,714,539 | B1 * | 8/2023 | Boswell | G06F 3/04883 715/856 |
| 12,450,144 | B1 * | 10/2025 | DeLonay | G06F 9/451 |
| 2010/0118147 | A1 | 5/2010 | Dorneich et al. | |
| 2013/0021173 | A1 * | 1/2013 | Huang | G01D 7/08 340/960 |
| 2014/0040763 | A1 * | 2/2014 | Chakra | G06F 3/0482 715/748 |
| 2022/0215767 | A1 * | 7/2022 | He | B64D 43/00 |
| 2022/0254257 | A1 | 8/2022 | Urbanec et al. | |
| 2023/0021088 | A1 | 1/2023 | V et al. | |
| 2023/0419843 | A1 | 12/2023 | Zhou et al. | |
| 2024/0354232 | A1 * | 10/2024 | Kumar | G06F 11/3676 |
| 2025/0013417 | A1 * | 1/2025 | Dehkordi | G06F 9/451 |
| 2025/0022379 | A1 * | 1/2025 | Groden | B64C 19/02 |
| 2025/0036281 | A1 * | 1/2025 | Banks | G06F 3/03 |
| 2025/0141755 | A1 * | 5/2025 | Soyarslan | G06F 40/169 |
| 2025/0147779 | A1 * | 5/2025 | Choi | B60K 35/26 |
| 2025/0390321 | A1 * | 12/2025 | Gurusamy | G06F 9/451 |
| 2026/0044354 | A1 * | 2/2026 | DeLonay | G06F 9/451 |

FOREIGN PATENT DOCUMENTS

| | | | |
|---|---|---|---|
| WO | 2020125840 | A1 | 6/2020 |
| WO | 2023166267 | A1 | 9/2023 |

* cited by examiner

SYSTEMS AND METHODS FOR PROVIDING INTERACTIVE FUNCTIONALITY TO DATA STREAMS

CROSS REFERENCE TO RELATED APPLICATION

This application claims priority to India Provisional Patent Application No. 202411047063, filed Jun. 19, 2024, the entire content of which is incorporated by reference herein.

TECHNICAL FIELD

The present invention generally relates to remote streaming of interactive programs, and more particularly relates to systems and methods for providing interactive functionality to a data stream, such as a streamed video.

BACKGROUND

Browsing the Internet, using applications, and/or running programs in a vehicle, such as an aircraft, is currently possible via handheld devices, such as tablet devices or mobile computing devices (e.g., laptops). For example, pilots and crew of aircraft may browse websites using iPads or electronic flight bags (EFBs) for information relevant to the flight path of the aircraft and/or other information. Pilots and crew may also use such devices for running applications and/or other programs that connect to remote systems to perform various tasks and provide information related to the vehicle to the pilots and crew.

However, security concerns have rendered hosting a browser and certain applications or programs (e.g., including website features/data) on high design assurance level (DAL) systems (e.g., safety-critical systems) difficult or impractical. Various solutions that have been presented to address these safety and security concerns generally include secure browser systems wherein an intended application or service is executed on a remote system, either within the cockpit or in the cloud and/or ground servers and video streamed onto a display monitor onboard the aircraft. Most of these services and applications are interactive in nature and take user inputs via touch gestures, cursor control device, etc.

Unfortunately, these systems may have poor responsiveness to user actions due to the latencies in the system. For example, if the user is interested in centering a view on a map to a particular location in the video the action of tapping and/or clicking needs be communicated back to the remote application and then the remote application may respond with a new video stream of possible tasks on top of the image. This would result in poor response to the user's action.

Hence, there is a need for systems and methods for providing remote operation of programs with reduced latency. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various examples, a method is provided that, in one example, includes executing a program with a first controller having one or more processors on a remote system, generating, with the first controller, a data stream that includes primary information indicative of a visual representation of a graphical user interface (GUI) of the program, transmitting, with the first controller, the data stream from the remote system to a second controller comprising one or more processors onboard an aircraft, displaying, by the second controller, the visual representation of the GUI on a display system of the aircraft based on the primary information, detecting, with the second controller, an interaction by a user onboard the aircraft with an interactive element of the GUI represented on the display system, and modifying, by the second controller, the visual representation of the GUI on the display system in response to detecting the interaction such that a modified visual representation of the GUI is displayed on the display system, wherein the visual representation of the GUI is modified using supplemental information embedded in the data stream.

In various examples, a system is provided that, in one example, includes a remote system that includes a first controller and a first communication system operably coupled to the first controller, wherein the first controller is configured to, by one or more processors: execute a program in a memory device, generate a data stream that includes primary information indicative of a visual representation of a graphical user interface (GUI) of the program, transmit the data stream via the first communication system, and an aircraft that includes a second controller, a second communication system, and a display system, wherein the second communication system and the display system are operably coupled to the second controller, wherein the second controller is configured to, by one or more processors: receive, via the second communication system, the data stream from the remote system, display the visual representation of the GUI on the display system of the aircraft based on the primary information, detect an interaction by a user onboard the aircraft with an interactive element of the GUI represented on the display system, and modify the visual representation of the GUI on the display system in response to detecting the interaction such that a modified visual representation of the GUI is displayed on the display system, wherein the visual representation of the GUI is modified using supplemental information embedded in the data stream.

Furthermore, other desirable features and characteristics of the systems and methods will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
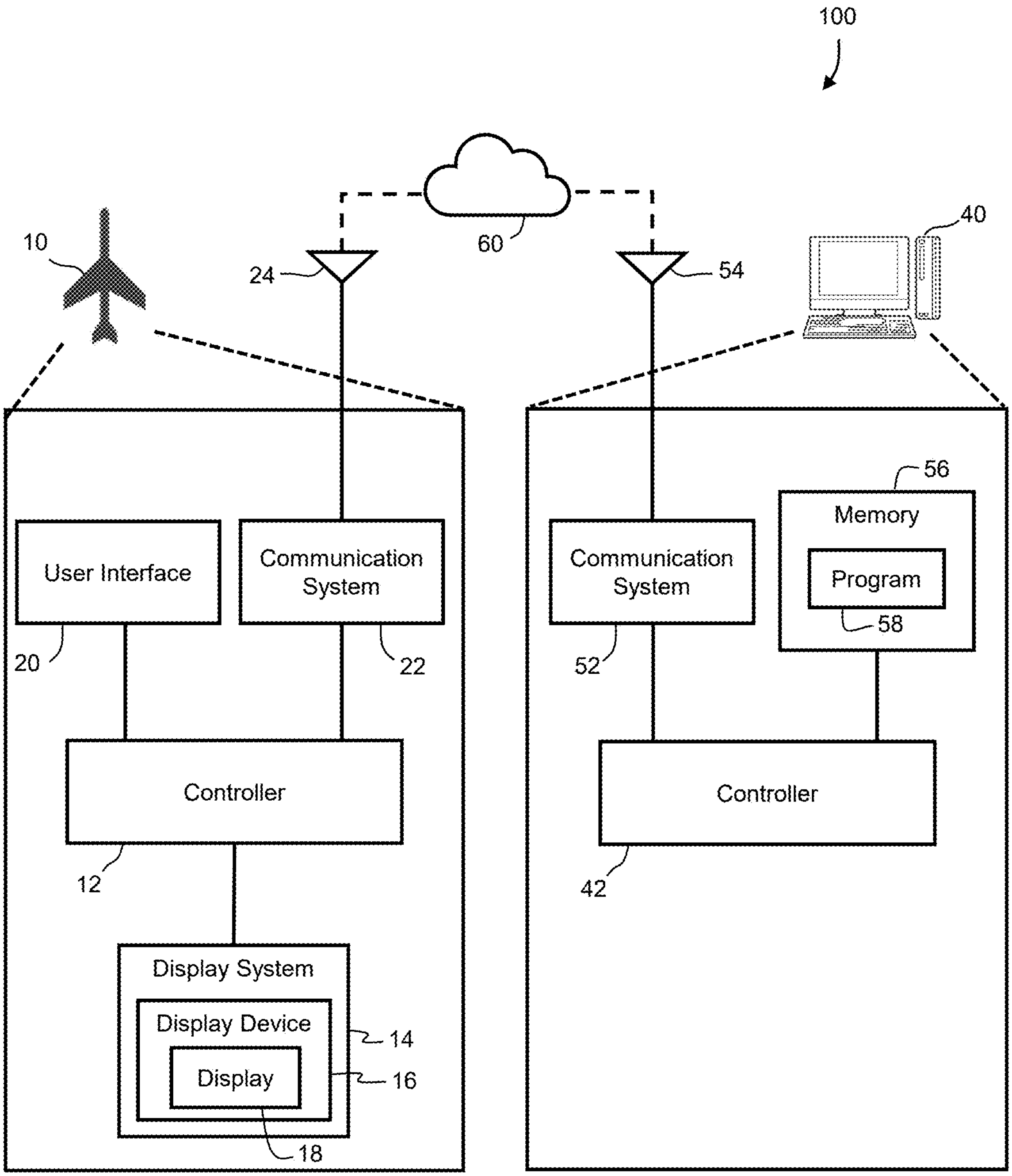
FIG. 1 schematically represents a program streaming system that includes a mobile platform and a remote system in communication therewith in accordance with an embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide for remote streaming of interactive programs for a mobile platform that are capable of reducing latency associated with performing various actions and tasks. In general, the systems and methods include a program (e.g., application or service) executing on a remote system, a communication network streaming a visual representation (e.g., an image or video) of the program to a mobile platform, and a display device onboard the mobile platform displaying the visual representation. The system and methods include embedded supplemental data within the data stream that is accessible by a system onboard the mobile platform for interacting with the visual representation without a prerequisite of communicating with the remote system to update the program. Notably, although the systems and methods are discussed in reference to mobile platforms, it will be appreciated that various aspects of the systems and methods are not limited to use with mobile platforms and are applicable to streaming of interactive programs between remote systems in general.

The mobile platform may be any type of vehicle, such as but not limited to various types of aircraft. It should be noted that the term aircraft, as utilized herein, may include any manned or unmanned object capable of flight. Examples of aircraft may include, but are not limited to, fixed-wing aerial vehicles (e.g., propeller-powered or jet powered), rotary-wing aerial vehicles (e.g., helicopters), manned aircraft, unmanned aircraft (e.g., unmanned aerial vehicles, or UAVs), delivery drones, etc. For convenience, the systems and methods will be described in reference to a manned airplane; however, as noted the systems and methods are not limited to such application.

Referring now to FIG. 1, a program streaming system 100 is illustrated in accordance with an exemplary and nonlimiting embodiment of the present disclosure. As schematically depicted in FIG. 1, the system 100 includes an aircraft 10 and a remote system 40. The aircraft 10 may include a controller 12 operationally coupled to a display device 16, which may be part of a display system 14, a user interface 20, and a communication system 22 including an antenna 24, which may wirelessly transmit data to and receive data from various external sources physically and/or geographically remote to the aircraft 10 such as the remote system 40. The remote system 40 may include a controller 42 operationally coupled to computer-readable storage media or memory 56 and a communication system 52 including an antenna 54, which may wirelessly transmit data to and receive data from various external sources physically and/or geographically remote to the remote system 40, such as the aircraft 10.

Although schematically illustrated in FIG. 1 as a single unit, the individual elements and components of the system 100 can be implemented in a distributed manner utilizing any practical number of physically distinct and operatively interconnected pieces of hardware or equipment.

The term "controller," as appearing herein, broadly encompasses those components utilized to carry-out or otherwise support the processing functionalities of the system 100. Accordingly, the controllers 12, 42 can encompass or may be associated with any number of individual processors, flight control computers, navigational equipment pieces, computer-readable memories, power supplies, storage devices, interface cards, and other standardized components.

In various embodiments, each of the controllers 12, 42 include at least one processor, a communication bus, and a computer readable storage device or media. The processor performs the computation and control functions of the controllers 12, 42. The processor can be any custom made or commercially available processor, a central processing unit (CPU), a graphics processing unit (GPU), an auxiliary processor among several processors associated with the controllers 12, 42, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controllers 12, 42. The bus serves to transmit programs, data, status and other information or signals between the various components coupled to the controllers 12, 42. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, perform logic, calculations, methods and/or algorithms, and generate data based on the logic, calculations, methods, and/or algorithms. Although only one of each of the controllers 12, 42 are shown in FIG. 1, embodiments of the system 100 can include any number of controllers 12, 42 that communicate over any suitable communication medium or a combination of communication mediums and that cooperate to perform logic, calculations, methods, and/or algorithms, and generate data. In various embodiments, the controllers 12, 42 each includes or cooperates with at least one firmware and software program (generally, computer-readable instructions that embody an algorithm) for carrying-out the various process tasks, calculations, and control/display functions described herein. During operation, each of the controllers 12, 42 may be programmed with and execute at least one firmware or software program (e.g., a program 58 for the controller 42) that embodies one or more algorithms, to thereby perform the various process steps, tasks, calculations, and control/display functions described herein.

Each of the controllers 12, 42 may exchange data with one or more external sources to support operation of the system 100 in various embodiments. In this case, bidirectional wireless data exchange may occur via the communication systems 22, 52 over a communications network 60, such as a public or private network implemented in accordance with Transmission Control Protocol/Internet Protocol architectures or other conventional protocol standards. Encryption and mutual authentication techniques may be applied, as appropriate, to ensure data security.

In various embodiments, each of the communication systems 22, 52 are configured to support instantaneous (i.e., real time or current) communications between various systems. The communication systems 22, 52 may each incorporate one or more transmitters, receivers, and the supporting communications hardware and software required for components of the system 100 to communicate as described herein. In various embodiments, one or both the communication systems 22, 52 may include additional communications not directly relied upon herein, such as bidirectional pilot-to-ATC (air traffic control) communications via a datalink, and any other suitable radio communication system that supports communications between the aircraft 10, the remote system 40, and various external source(s).

The memory 56 can encompass any number and type of storage media suitable for storing computer-readable code or instructions, such as the program 58, as well as other data generally supporting the operation of the system 100. As can be appreciated, the memory 56 may be part of the controller 42, separate from the controller 42, or part of the controller 42 and part of a separate system. The memory 56 can be any suitable type of storage apparatus, including various different types of direct access storage and/or other memory devices.

With continued reference to FIG. 1, the display device 16 can include any number and type of image generating devices on which one or more avionic displays 18 may be produced. In various embodiments, the display device 16 may be affixed to the static structure of the aircraft 10 cockpit as, for example, a Head Down Display (HDD) or Head Up Display (HUD) unit. Alternatively, the display device 16 may assume the form of a movable display device (e.g., a pilot-worn display device) or a portable display device, such as an Electronic Flight Bag (EFB), a laptop, or a tablet computer carried into the aircraft 10 cockpit by a pilot.

At least one avionic display 18 is generated on display device 16 during operation of the system 100. The term "avionic display" as used herein is synonymous with the terms "aircraft-related display" and "cockpit display" and encompasses displays generated in textual, graphical, cartographical, and other formats. The system 100 can generate various types of lateral and vertical avionic displays on which symbology, text annunciations, and other graphics pertaining to flight planning are presented for a pilot to view. The display device 16 is configured to continuously render at least one avionic display 18 showing a terrain environment at a current location of the aircraft 10. The avionic display 18 generated and controlled by the system 100 can include alphanumerical input displays of the type commonly presented on the screens of multi-function control and display units (MCDUs), as well as Control Display Units (CDUs) generally. Specifically, certain embodiments of the avionic displays include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, a human-machine interface, such as a touch screen display, is implemented as an integration of the user interface 20 and the display device 16. Via various display and graphics systems processes, the controller 12 may command and control the touch screen display generating a variety of graphical user interface (GUI) objects or elements, for example, buttons, sliders, and the like, which are used to prompt a user to interact with the human-machine interface to provide user input, and to activate respective functions and provide user feedback, responsive to received user input at the GUI element.

Figure 2:
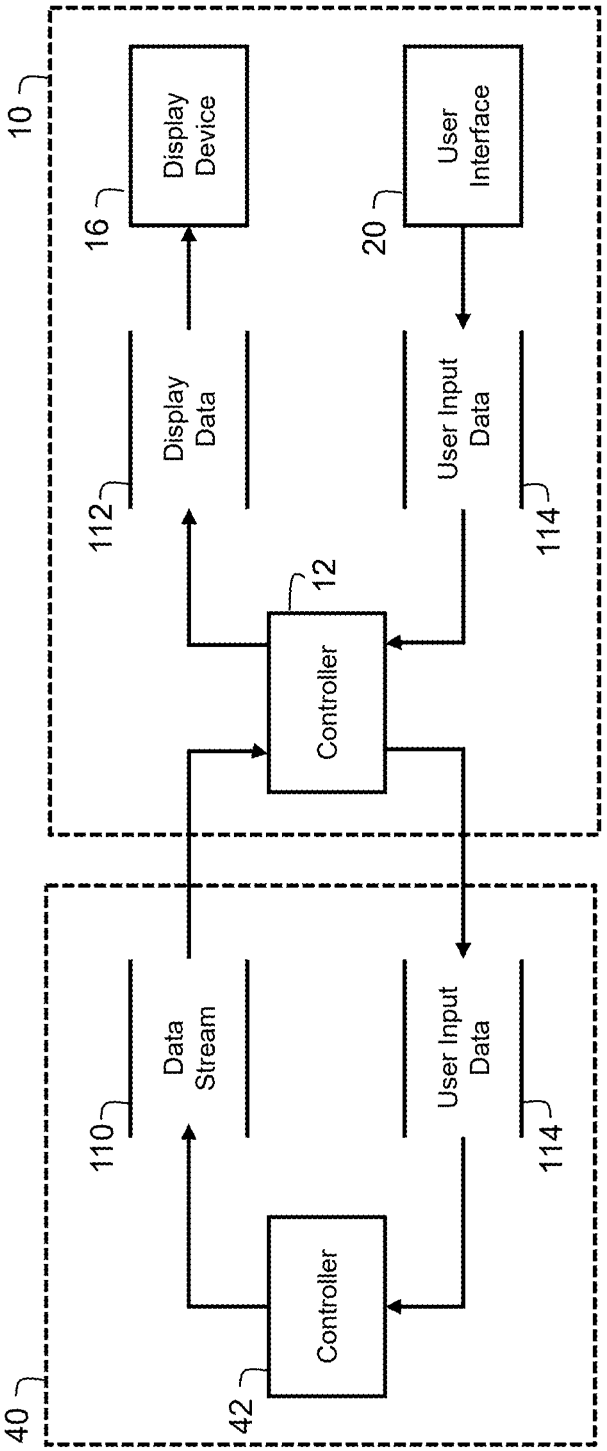
FIG. 2 is a dataflow diagram illustrating operation of the program streaming system of FIG. 1 in accordance with an embodiment.

Referring now to FIG. 2, and with continued reference to FIG. 1, a dataflow diagram is presented that illustrates various aspects of the system 100. During operation of the system 100, the remote system 40 executes the program 58 in the memory 56 and transmits a data stream 110 that includes primary information indicative of a visual representation of a graphic user interface (GUI) of the program 58 from the controller 42 to the communication network 60 via the communication system 52. The controller 12 of the aircraft 10 receives the data stream 110 from the communication network 60 via the communication system 22 and processes the primary information in the data stream 110 to generate display data 112. The display data 112 is transmitted to the display device 16 to display the visual representation (e.g., images or video) of the GUI of the program 58 on the display device 16. The controller 12 receives user input 114 from the user interface 20 in response to a user's interaction therewith and transmits the user input 114 to the communication network 60 via the communication system 22. The controller 42 of the remote system 40 receives the user input 114 from the communication network 60 via the communication system 54 and processes the user input 114 in the program 58.

In addition to the primary information indicative of the visual representation of the GUI of the program 58, the data stream 110 may also include embedded supplementary information indicative of one or more responses to interactive elements of the GUI. The supplementary information is accessible by the controller 12 to provide interactive options to the user, such as displaying a menu of tasks that may be performed upon selection by the user, for example, by interacting with a certain region of the display 18 representative of an interactive element of the GUI. Since the supplemental information is readily available to the controller 12, certain actions or tasks may be performed without a necessity to request to update the program 58. Instead, certain actions or tasks may be executed and overlayed on the currently displayed visual representation. This functionality may promote improved responsiveness to user commands and thereby enhance the user experience. Once the user selects the desired action or task, the user input data 114 comprising the selected action or task may be transmitted to the program 58 for further processing (e.g., updating the program, performing tasks, providing instructions, etc.). In the meantime, processing feedback can be displayed to the user on the display device 16 to provide visual feedback, for example, confirming that the selection has been registered and is being serviced.

The supplemental information may include various interactive options such as, but not limited to, menu options and lists, tabs, scaling operations, panning operations, etc. For example, the GUI may include a terrain map, and the supplement information may allow for the user to scale and/or pan the terrain map locally (e.g., implemented by the controller 12) prior to receiving an updated data stream from the controller 42. In such examples, portions of the terrain map may be pixelated or missing prior to being updated by the remote system.

Figure 3:
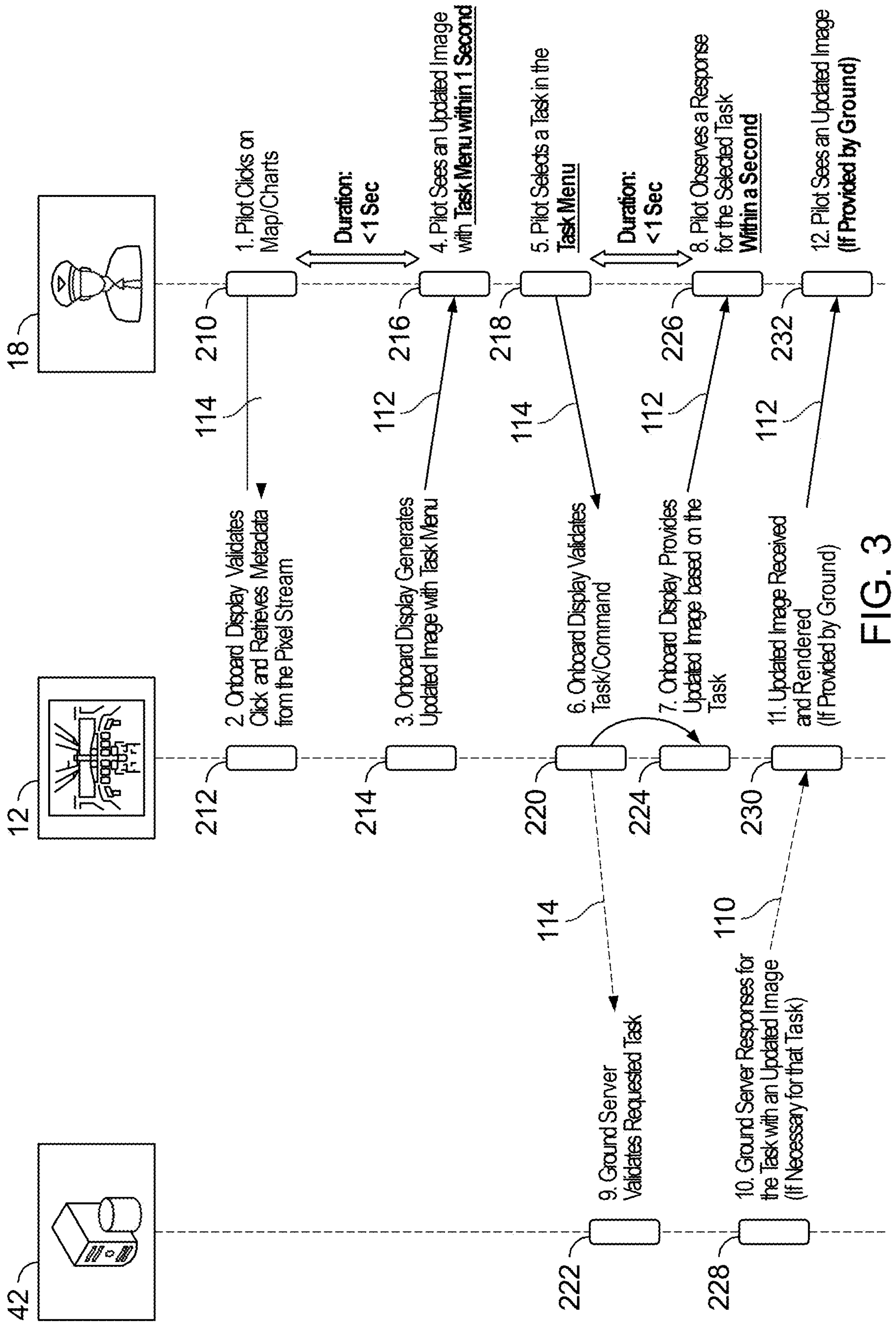
FIG. 3 is a dataflow diagram illustrating a first exemplary series of actions performed with the system of FIG. 1 in accordance with an embodiment.

As an example, FIG. 3 illustrates a series of events over a period of time during use of the system 100. At 210, a user selects a maps/charts element displayed on the display device 16 that is generated based on the primary information of the data stream 110. The user data 114 indicative of the selection on the map is transmitted to the controller 12 which processes the user data 114. At 212, the controller 12 validates the selection, determines that a response to the selection may be provided based on the supplemental data, and retrieves the corresponding supplemental data (e.g., metadata) from the data stream 110. At 214, the controller 12 updates the display data 112 to include a task menu (i.e., the response to the selection) and transmits the display data 112 to the display device 16. At 216, the display device 16 displays a modified visual representation including the task menu. In some examples, the display device 16 may display the response (i.e., the task menu) to the user selection in a significantly reduced time relative to receiving an update from the remote system 40, such as in less than one second.

At 218, the user may select a task from the task menu. The user data 114 indicative of the selected task is transmitted to the controller 12. At 220, the controller 12 processes the user data 114 and validates the selected task. The controller 12 may determine that the program 58 needs to be updated. Therefore, the controller 12 transmits the user data 114 to the remote system 40. At 222, the remote system 40 processes the user data 114 and validates the selected task. During this time, the controller 12 updates, at 224, the display data 112 to include a response to the selected task and transmits the display data 112 to the display device 16. At 226, the display device 16 displays a response to the selected task based on the received display data 112. In some examples, the display device 16 may display the response to the selected task in a significantly reduced time relative to receiving an update from the remote system 40, such as in less than one second.

At 228, the remote system 40 updates the program 58 to perform the selected task or provide instructions for the controller 12 to perform the selected task, and transmits the updated data stream 110 to the controller 12. At 230, the controller 12 updates the display data 112 based on the updated data stream 110 and transmits the display data 112 to the display device 16. At 232, the display device 16 displays the updated visual representation of the GUI which includes the response to the selected task.

As indicated by this example, the system 100 can significantly reduce latency between user selections and responses by providing responses and/or preliminary responses from the controller 12 without communication with the remote system 40 and/or prior to receiving a response from the remote system 40.

Figure 4:
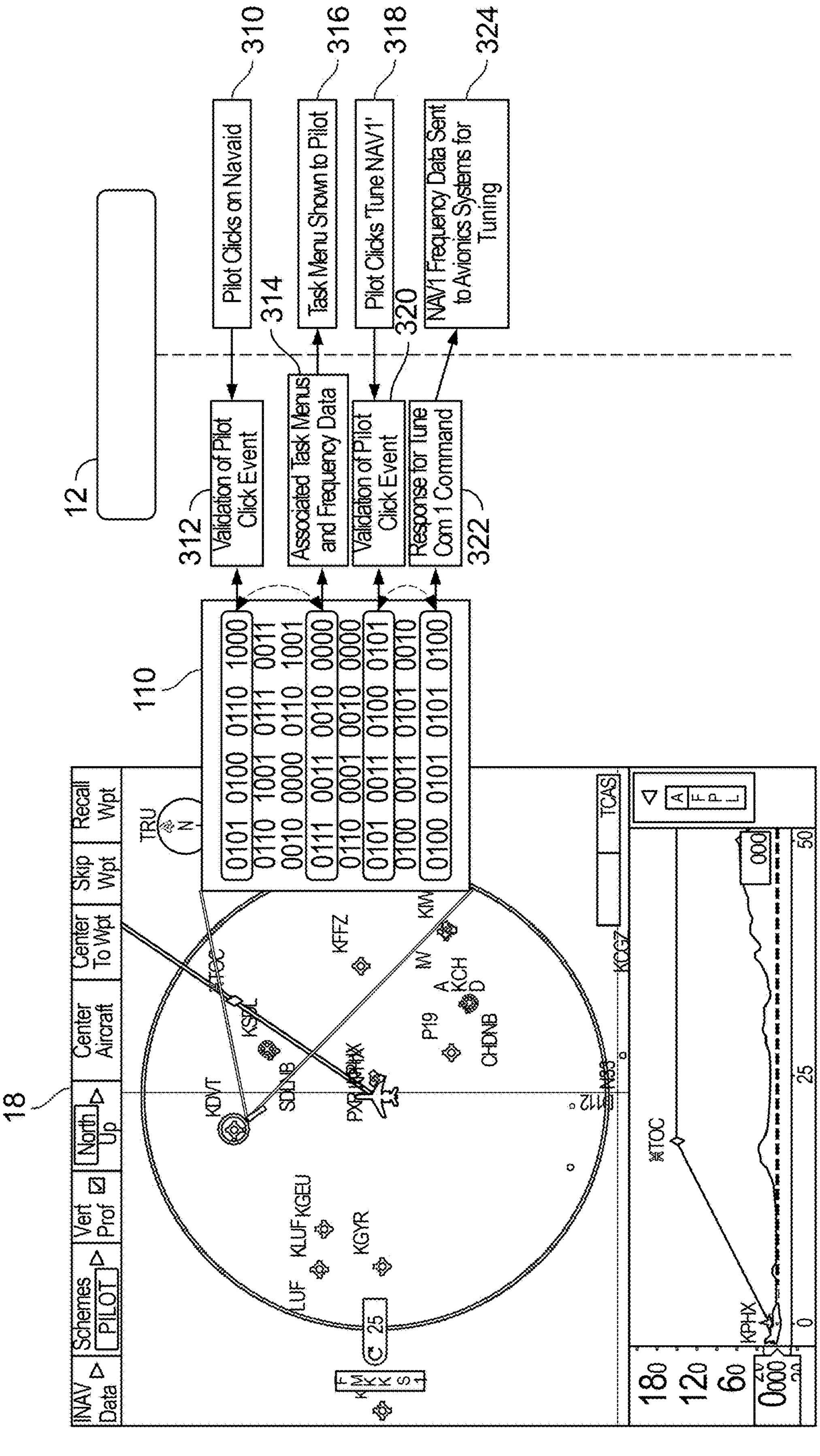
FIG. 4 is a dataflow diagram illustrating a second exemplary series of actions performed with the system of FIG. 1 in accordance with an embodiment.

Referring now to FIG. 4, another example of the operation of the system 100 is illustrated. In this example, the display 18 shows a position of the aircraft 10 during a flight with an icon 300 centered on a terrain map 310. A navaid 302 ("Nav1") is shown on the display 18. At 310, the user selects the navaid 302 and the selection is transmitted to the controller 12. At 312, the controller 12, using the embedded supplemental information in the data stream 110, validates the selection, and at 314 transmits a modified visual representation to the display device 16 that includes a task menu and frequency data associated with the navaid 302. At 320, the user selects from the task menu "Tune Nav1" and transmits the selection to the controller 12. At 318, the controller 12, using the data stream 110, validates the selection. At 322, the controller 12 generates a response, in this instance, a command for tuning the navaid 302 ("Nav1"). At 324, the frequency data of the navaid 302 ("Nav1") is provided to an avionics system of the aircraft 10 for tuning. In some examples, the system 100 may be configured such that the command is automatically accepted by the avionics system but requires a confirmation by the user for activation. In some examples, displaying the task menu, the frequency data, and/or generating the command may be performed without communicating with the remote system 40 to update the program 58. In some examples, displaying the task menu, the frequency data, and/or generating the command may be performed as preliminary actions while awaiting a response from the remote system 40.

Figure 5:
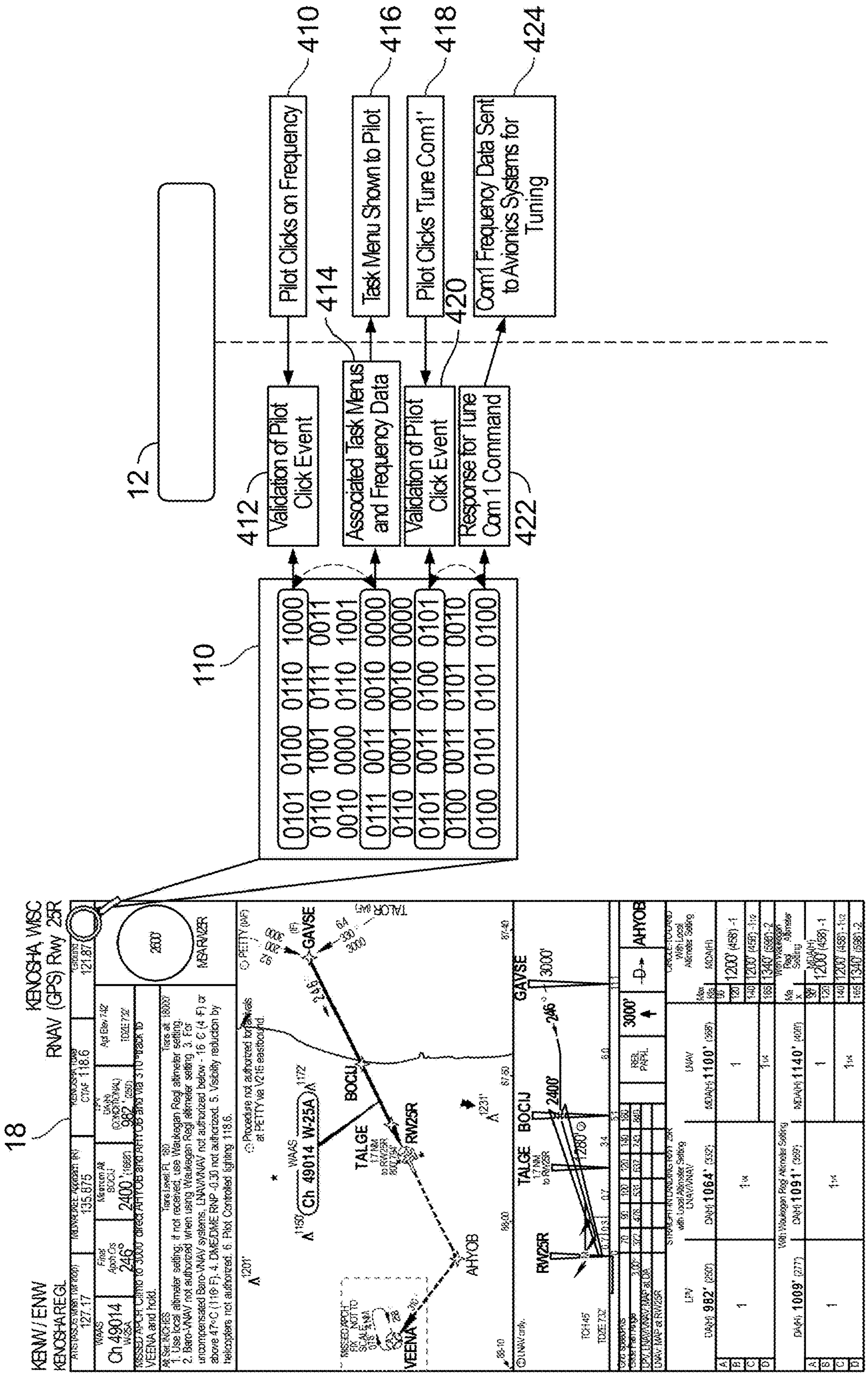
FIG. 5 is a dataflow diagram illustrating a third exemplary series of actions performed with the system of FIG. 1 in accordance with an embodiment.

Referring now to FIG. 5, yet another example of the operation of the system 100 is illustrated. In this example, the display 18 shows a flight plan and associated information during a flight of the aircraft 10. At 410, the user selects a region of the display 18 corresponding to frequency of an onboard radio (e.g., of the communication system 22) and the selection is transmitted to the controller 12. At 412, the controller 12, using the embedded supplemental information in the data stream 110, validates the selection, and at 414 transmits a modified visual representation to the display device 16 that includes a task menu and the requested frequency data. At 418, the user selects from the task menu "Tune Com1" and transmits the selection to the controller 12. At 420, the controller 12, using the data stream 110, validates the selection. At 422, the controller 12 generates a response, in this instance, a command for tuning the radio ("Com1"). At 424, the frequency data of the radio ("Com1") is provided to the avionics system of the aircraft 10 for tuning. In some examples, displaying the task menu, the frequency data, and/or generating the command may be performed without communicating with the remote system 40 to update the program 58. In some examples, displaying the task menu, the frequency data, and/or generating the command may be performed as preliminary actions while awaiting a response from the remote system 40.

The primary information may be provided in the data stream 110 in various formats. In some examples, the primary information of the data stream 110 may include pixels that, in combination, form the visual representation.

The supplemental information may be embedded in the data stream 110 and accessed by the controller 12 by various methods, including those known in the art. In general, the controller 42 of the remote system 40 may be configured to embed the supplemental information as supplemental data into the data stream 110 using a predetermined encoding method, and the controller 12 of the aircraft 10 may be configured to decode the embedded supplemental data using algorithms and techniques tailored to the predetermined encoding method to extract and interpret the supplemental information.

In some examples, the supplement information may be embedded as metadata in the data stream 110. In some examples, the supplement information may be embedded interactive elements (e.g., selectable buttons, links, or overlays that provide additional information or allow the user to interact with the content). In some examples, the supplement information may be embedded as images or graphics within video frames. In some examples, the data stream 110 includes a streaming video format (e.g., MP4, WebM, or MPEG-DASH) that supports metadata tracks that can carry additional information alongside video frames thereof. In some examples, the controller 12 of the aircraft 10 is configured to perform metadata parsing of the data stream 110. In some examples, the data stream 110 includes a streaming video with embedded data packets within the video stream itself (e.g., multiplexing of multiple data streams). In some examples, the controller 12 of the aircraft 10 is configured to perform demultiplexing of the data packets from a video stream, that is, to separate two or more data streams (e.g., video, audio, data) multiplexed within the data stream and extract the embedded data packets for further processing.

Figure 6:
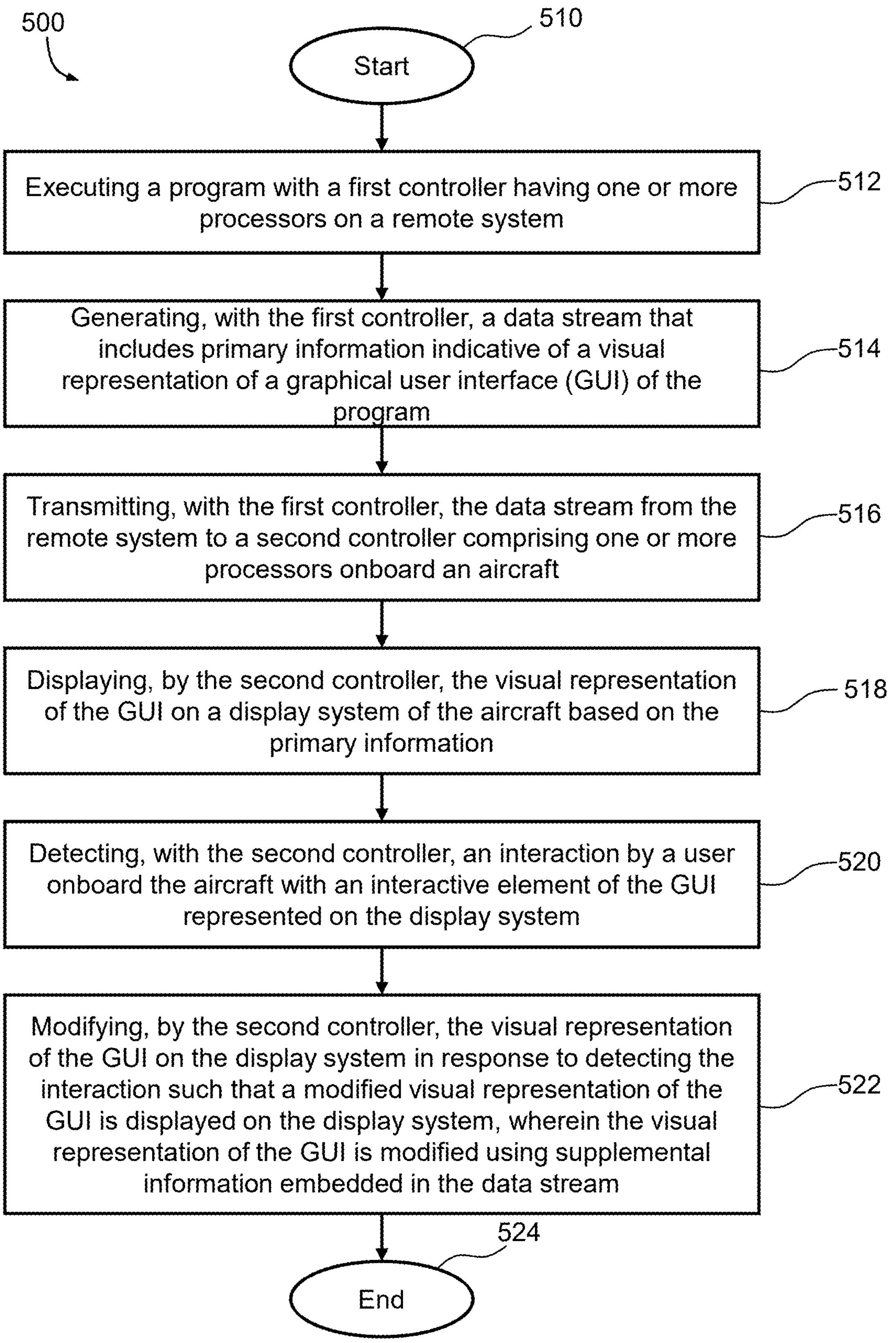
FIG. 6 is a flowchart that illustrates a method for streaming an interactive program in accordance with an embodiment.

The systems disclosed herein, including the system 100, provide for methods of facilitating interaction with a streamed image or video. For example, FIG. 6 is a flowchart illustrating an exemplary method 500. The method 500 may start at 510. At 512, the method 500 may include executing a program with a first controller having one or more processors on a remote system. At 514, the method 500 may include generating, with the first controller, a data stream that includes primary information indicative of a visual representation of a graphical user interface (GUI) of the program. At 516, the method 500 may include transmitting, with the first controller, the data stream from the remote system to a second controller comprising one or more processors onboard an aircraft. At 518, the method 500 may include displaying, by the second controller, the visual representation of the GUI on a display system of the aircraft based on the primary information. At 520, the method 500 may include detecting, with the second controller, an interaction by a user onboard the aircraft with an interactive element of the GUI represented on the display system. At 522, the method 500 may include modifying, by the second controller, the visual representation of the GUI on the display system in response to detecting the interaction such that a modified visual representation of the GUI is displayed on the display system. The visual representation of the GUI is modified using supplemental information embedded in the data stream. The method 500 may end at 520.

The systems and methods disclosed herein provide various benefits over certain existing systems and methods. For example, the supplemental information allows for performing various actions and/or tasks onboard the aircraft 10 without communicating with the remote system 40 or prior to receiving a response from the remote system 40.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems and methods described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method, comprising:

executing a program with a first controller having one or more processors on a remote system;

generating, with the first controller, a data stream that includes primary information indicative of a visual representation of a graphical user interface (GUI) of the program;

transmitting, with the first controller, the data stream from the remote system to a second controller comprising one or more processors onboard an aircraft;

displaying, by the second controller, the visual representation of the GUI on a display system of the aircraft based on the primary information;

detecting, with the second controller, an interaction by a user onboard the aircraft with an interactive element of the GUI represented on the display system; and modifying, by the second controller, the visual representation of the GUI on the display system in response to detecting the interaction such that a modified visual representation of the GUI is displayed on the display system, wherein the visual representation of the GUI is modified using supplemental information embedded in the data stream.

2. The method of claim 1, further comprising:

transmitting, by the second controller, the interaction with the interactive element to the remote system in response to detecting the interaction by the user;

updating, by the first controller, the program on the remote system based on the interaction;

generating, with the first controller, an updated data stream that includes updated primary information indicative of an updated visual representation of the graphical user interface (GUI) of the program;

transmitting, by the first controller, the updated data stream from the remote system to the second controller; and replacing, by the second controller, the modified visual representation of the GUI on the display system with the updated visual representation.

3. The method of claim 1, wherein the remote system is a ground-based system.

4. The method of claim 1, further comprising validating, by the second controller, user input data received by the second controller from a user interface onboard the aircraft prior to modifying the visual representation, wherein the user input data includes user information indicative of the interaction by the user with the interactive element.

5. The method of claim 1, wherein the supplemental information is represented by metadata embedded in the data stream.

6. The method of claim 1, wherein modifying the visual representation includes displaying a menu of tasks that the program is configured to perform in response to a command by the user.

7. The method of claim 6, further comprising:

detecting, by the second controller, a selection of a first task from the menu of tasks; and performing, by the second controller, the first task without prior instructions from the remote system.

8. The method of claim 7, wherein the first task includes modifying an onboard system of the aircraft.

9. The method of claim 6, further comprising:

detecting, by the second controller, a selection of a first task from the menu of tasks;

transmitting, by the second controller, the selection of the first task to the remote system in response to detecting the selection by the user;

providing, by the second controller, an indication to the user that the selection has been received; and performing, by the first controller, the first task or transmitting instructions to the second controller to perform the first task.

10. The method of claim 1, wherein modifying the visual representation includes modifying a view of a terrain map.

11. A system, comprising:

a remote system that includes a first controller and a first communication system operably coupled to the first controller, wherein the first controller is configured to, by one or more processors:

execute a program in a memory device;

generate a data stream that includes primary information indicative of a visual representation of a graphical user interface (GUI) of the program;

transmit the data stream via the first communication system; and an aircraft that includes a second controller, a second communication system, and a display system, wherein the second communication system and the display system are operably coupled to the second controller, wherein the second controller is configured to, by one or more processors:

receive, via the second communication system, the data stream from the remote system;

display the visual representation of the GUI on the display system of the aircraft based on the primary information;

detect an interaction by a user onboard the aircraft with an interactive element of the GUI represented on the display system; and modify the visual representation of the GUI on the display system in response to detecting the interaction such that a modified visual representation of the GUI is displayed on the display system, wherein the visual representation of the GUI is modified using supplemental information embedded in the data stream.

12. The system of claim 11, wherein the second controller is configured to transmit the interaction with the interactive element to the remote system in response to detecting the interaction by the user, wherein the first controller is configured to update the program based on the interaction, generate an updated data stream that includes updated primary information indicative of an updated visual representation of the graphical user interface (GUI) of the program, and transmit the updated data stream from the remote system to the second controller, wherein the second controller is configured to replace the modified visual representation of the GUI on the display system with the updated visual representation.

13. The system of claim 11, wherein the remote system is a ground-based system.

14. The system of claim 11, wherein the second controller is configured to validate user input data received by the second controller from a user interface onboard the aircraft prior to modifying the visual representation, wherein the user input data includes user information indicative of the interaction by the user with the interactive element.

15. The system of claim 11, wherein the supplemental information is represented by metadata embedded in the data stream.

16. The system of claim 11, wherein the second controller is configured to modify the visual representation by displaying a menu of tasks that the program is configured to perform in response to a command by the user.

17. The system of claim 16, wherein the second controller is configured to detect a selection of a first task from the menu of tasks, and perform the first task without prior instructions from the remote system.

18. The system of claim 17, wherein the first task includes modifying an onboard system of the aircraft.

19. The system of claim 16, wherein the second controller is configured to detect a selection of a first task from the menu of tasks, transmit the selection of the first task to the remote system in response to detecting the selection by the user, and provide an indication to the user that the selection has been received, wherein the first controller is configured to perform the first task or transmit instructions to the second controller to perform the first task.

20. The system of claim 11, wherein the second controller is configured to modify the visual representation by modifying a view of a terrain map.

* * * * *